United States Patent Office 3,351,615
Patented Nov. 7, 1967

3,351,615
PRODUCTION OF MELAMINE-FORMALDEHYDE PRECONDENSATES BY COMPLETING THE REACTION IN THE PRESENCE OF UREA AND GLYCERINE
Alex F. Gordon, Black Mountain, N.C., assignor to United Merchants and Manufacturers, Inc., New York, N.Y., a corporation of Delaware
No Drawing. Filed Mar. 3, 1964, Ser. No. 349,170
2 Claims. (Cl. 260—67.6)

This invention relates to the production of melamine-formaldehyde resins useful, among other fileds, in the finishing of textiles to impart crease and wrinkle-resistance and a desired hand to the fabric.

Melamine-formaldehyde resins in partially condensed form, herein referred to as melamine-formaldehyde precondensates, are widely used in finishing of textiles. They are commonly applied to the textiles in an aqueous medium. Such resins are commonly produced by condensing melamine and formaldehyde in the presence of methanol under reflux conditions. The reaction between the melamine and formaldehyde is exothermic and difficult to control so as to form chiefly the desired tri- or tetra-methylol melamine. Monomethylol and dimethylol melamine resins formed have a tendency to react with another molecule of primary amine or —NH—CH$_2$—OH group to produce polymers in accordance with the following equations:

(1)
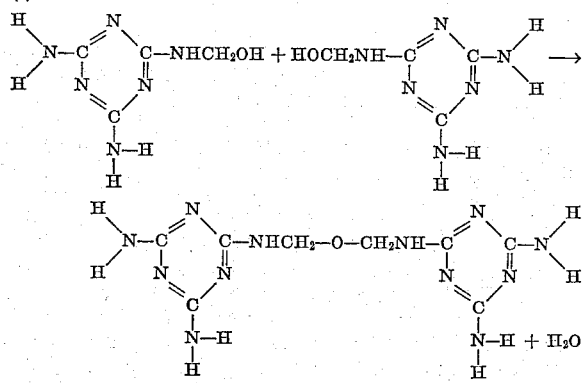

(2)
Melamine—HN—CH$_2$OH + HO·CH$_2$—NH—Melamine ⟶

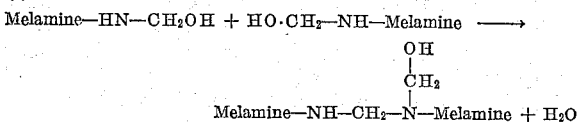

Melamine—NH—CH$_2$—N—Melamine + H$_2$O

Reaction 1 proceeds more readily than the desired methylolation reaction of the primary amino groups in accordance with reaction 3 below:

(3)
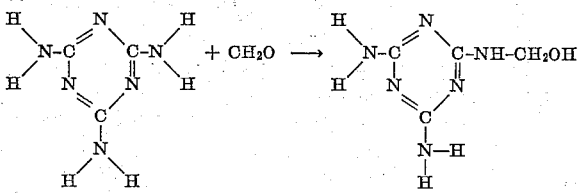

To the extent reactions 1 and 2 take place, i.e., polymer formation occurs and the solubility of the melamine-formaldehyde resin in water is thus decreased. Also reactions 1 and 2 tend to result in the production of a product having poor shelf life.

In an endeaver to control the reaction and minimize polymer formation, such melamine-formaldehyde resins are produced by condensing melamine and formaldehyde employing a large excess of methanol over and above the amount required to provide the solvent medium for the reaction. This large excess of methanol is used to block or minimize polymer formation under the reaction condiitons which as noted is reflux temperature conditions. At the completion of the reaction the excess methanol is recovered from the resin solution by distilling off the methanol.

This procedure is objectionable for a number of reasons including among others that it requires refluxing of the reaction mixture and hence the use of relatively expensive reflux equipment; it involves the expense of handling large excesses of methanol and the further expense of recovering the excess methanol; and notwithstanding the utilization of such large excess of methanol the precondensate formed has unsatisfactory water-solubility characteristics due, it is believed, chiefly to polymer formation as hereinabove explained. For textile finishing purposes a highly water-soluble melamine-formaldehyde resin precondensate is preferred because the greater the water-solubility of the precondensate the better its penetration into the fibers and the better the finish on the fabric.

It is a principal object of the present invention to provide a process for producing melamine-formaldehyde resin precondensates of improved water-solubility characteristics eminently satisfactory for use in the finishing of textiles, particularly in the avoidance of heat discoloration and odor formation at high temperature.

Another object of this invention is to provide such process which can be carried out at relatively low temperatures, temperatures not exceeding 200° F., and hence not requiring the use of relatively expensive reflux equipment for its practice.

Still another object of this invention is to provide such process in which the solvent medium employed for the reaction such as methanol and need not be used in relatively large amounts; the amount of solvent can be such as to produce a resin solution of desired concentration requiring no distillation for recovery of excess solvent.

Other objects and advantages of this invention will be apparent from the following disclosure thereof.

In this specification, all percentages and parts are given on a weight basis and all temperatures in degrees F.

In accordance with this invention melamine is condensed with formaldehyde in a suitable reaction medium, preferably methanol but, which can be water, employing from 3 to 6 mols of formaldehyde per mol of melamine at a temperature below the boiling point of the reaction mixture and under pH conditions of from 4 to 7 and after the condensation reaction has been initiated and proceeded for 35% to 60% of the total reaction time, a polyhydric alcohol, if not previously introduced, is introduced and also a compound containing a primary amino group to form a reaction mixture containing from 0.1 to 0.5 mol of the latter and from 0.1 to 0.5 mol of polyhydric alcohol per mol of melamine and the reaction completed to form the precondensate at a temperature not exceeding 200° F., preferably 160° F. to 190° F.

The incorporation of the compound containing a primary amino group and polyhydric alcohol into the reaction mixture, surprisingly tends to minimize, if not completely prevent, the formation of melamine-formaldehyde polymers in accordance with reactions 1 and 2 above. The explanation for this is not fully understood. It is believed that the mixture of the primary amino group containing compound and polyhydric alcohol and/or their reaction products have "humectant" properties, i.e., tend to block OH groups and in this way tend to minimize or prevent polymer formation between mono- and polymethylol melamine monomers, under the temperature and pH conditions at which the condensation between the melamine and formaldehyde is carried out. Some reaction may take place between the primary amino group containing compound, polyhydric alcohol and formaldehyde or directly between the primary amino group containing compound and formaldehyde forming a resin which blends with the melamine-formaldehyde resin precondensate. To minimize reaction between the primary amino group containing compound and formaldehyde, as noted, the compound is added after the reaction between the melamide and formaldehyde has been initiated. The invention is not to be limited to the above explanation. The important factor is that the addition of the compound to the reaction mixture containing polyhydric alcohol after passage of about 35% of the total reaction time and completing the reaction by heating to a temperature not exceeding 200° F. surprisingly results in the production of melamine-formaldehyde precondensates having for all practical purposes infinite solubility in water and eminently satisfactory for use in the finishing of textiles.

The reaction between the melamine and the formaldehyde is preferably carried out in methanol. The amount of methanol used should not exceed about 6 mols per mol of melamine, which, as noted, is reacted with formaldehyde in the proportion of from 3 to 6 mols of formaldehyde per mol of melamine. Instead of or as replacement for all or a part of the methanol, water can be used, although, as indicated, methanol is preferred. The amount of methanol and/or water used should be such as to produce the melamine-formaldehyde precondensate resin solution of the desired concentration, i.e., an excess of solvent requiring removal at the completion of the reaction need not be used. This is an important feature of the invention in that it results in an economy in the production of the resin solution, eliminating the necessity for distilling the reaction product to remove excess solvent for the resin precondensate.

The compound containing a primary amino group employed has the formula

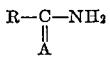

in which A is hydrogen, oxygen, sulfur or an NH group; R is hydrogen, NH$_2$, —NH—CN, alkyl up to 3 carbon atoms or a phenyl group. Preferred compounds are urea, thiourea, dicyanodiamide, guanidine, benzamide, formamide, acetamide; of these compounds urea is particularly preferred because of its ready availability at relatively low cost.

The polyhydric alcohol can be

Ethylene glycol: CH$_2$OH—CH$_2$OH

Propylene glycol: CH$_3$CHOH·CH$_2$OH

Hexylene glycol: CH$_3$CHOH·CH$_2$COH(CH$_3$)$_2$

Glycerol: CH$_2$OH·CHOH—CH$_2$OH

Erythritol: CH$_2$—OH—CHOH—CHOH—CH$_2$·OH

Pentaerythritol: CH$_2$OH—C(CH$_2$OH)—CH$_2$OH
$\qquad\qquad\qquad\quad$ CH$_2$OH The melamine used in the reaction can be the melamine of commerce, 2,4,6-triamino, 1,3,5-triazine including the buffered melamines, such for example as Aero Melamine Buffered sold by the American Cyanamid Company.

The formaldehyde used can be any of the commercially available formaldehyde products including alcohol or aqueous solutions of formaldehyde and paraformaldehyde.

In general, the formaldehyde solution is charged first to the reactor, its pH adjusted to within the range of 4 to 7, if necessary, by the addition of alkali or acid as the case requires. Most commercial formaldehyde solutions, such, for example, as the alcoholic formaldehyde solutions available, have a pH within this range and hence require no adjustment. The formaldehyde solution is agitated and the melamine powder then added thereto. The polyhydric alcohol can next be introduced while continuing the agitation, although the stage of addition of the polyhydric alcohol is not critical; it can be added at any stage as long as it is present in the reaction mixture along with the primary amino group containing compound during the final stages of the condensation reaction between the melamine and formaldehyde. The methanol when used can be added at any desired stage, along with the formaldehyde or melamine or both. Using methanol, the amount added should be such as to have present in the reaction mixture not more than 6 mols of methanol per mol of melamine. The amount of methanol should be such as to produce at the end of the reaction a precondensate resin solution of the desired concentration.

The reaction mixture is then heated to a temperature not exceeding about 150° F., preferably within the range of from 130° F. to 150° F. over a period of from about 1 to about 1½ hours for a batch of about 5,000 pounds. The reaction mixture desirably is maintained at this temperature for an additional 10 to 20 minutes. The primary amino group containing compound is then added and the resultant reaction mixture heated to a temperature of 160° F. to 200° F., preferably 160° F. to 190° F., over a period of about one hour and maintained at this temperature for an additional hour. Thus the total reaction time is approximately from 3 to 4 hours for a batch of about 5,000 pounds. The primary amino group containing compound is introduced into this batch when from 35% to 60% of the total reaction time has elapsed. This is important. The addition of the compound after the reaction between the melamine and formaldehyde has been initiated and progressed for at least about 35% of the total reaction time insures that the formaldehyde will react with the melamine rather than with the primary amino group containing compound and that the latter along with the polyhydric alcohol and their reaction products are present in the reaction mixture during the latter stages to minimize or prevent polymer formation.

The reaction is carried out under atmospheric pressure conditions. Since the temperature conditions are below the boiling temperature of the reaction mixture reflux equipment is not needed. Thus the reaction can be carried out in comparatively inexpensive open stainless steel tanks.

Upon completion of the reaction, the reaction mixture is cooled, preferably slowly, desirably to room temperature and at least to a temperature not above 110° F. If suspended matter is present, the reaction mixture is filtered before use or before passage to storage. As a general rule, such filtration will be found unnecessary.

The resultant product is soluble in water, including cold water (35° F. to 65° F.), in all dilutions. The water solution has a pH of from 5.8 to 6.9. The resin precondensate as formed containing from 65% to 72% resin solids and has a specific gravity of 1.160 to 1.180 at 70° F. It is compatible with metallic and inorganic catalysts normally used in the finishing of textiles.

The following examples are given to illustrate the invention. It will be appreciated that the invention is not confined to these illustrative examples.

The examples are carried out in a stainless steel kettle equipped with an agitator and open to the atmosphere.

*Example I*

580 pounds of a methanol-formaldehyde solution containing 55% formaldehyde were charged into the kettle. The formaldehyde solution had a pH of from 5.7 to 7. The agitation was then started and 200 pounds of melamine added. 60 pounds of glycerine were then introduced followed by the addition of 80 pounds of methanol. Up to this point the reaction mixture was maintained at ambient temperature (about 70° F.). The reaction mixture was warmed slowly to a temperature of from 130° F. to 135° F. over a 1½ hour period and maintained at this temperature for an additional 20 minutes. 40 pounds of urea were then added and the reaction temperature permitted to rise over a one-hour period to a temperature of from 175° F. to 190° F. The reaction mixture was maintained at this temperature for an additional hour. The reaction was completed at the end of this period and the reaction mixture then cooled to room temperature.

The resultant melamine-formaldehyde precondensate had a concentration of from 65% to 72% resin solids; its specific gravity at 70° F. was within the range of from 1.15 to 1.18. The precondensate was soluble in cold water (40° F.) in all proportions. The pH of the aqueous solution was within the range of from 5.8 to 6.8.

The following table gives the data on Examples II to XII, inclusive, which involves substantially the same procedure, conditions and order of addition of the reactants, except for the particular reactants used and in the case of the polyhydric alcohol the amount thereof. The reactants used in each example and the amount of polyhydric alcohol used are given in this table. In Examples II to XII, inclusive, a methanol solution of formaldehyde containing 55% formaldehyde, the same as in Example I, was used. The numerical values in the table under each of the example numbers are the parts by weight of the identified constituent.

What is claimed is:
1. The process of producing a melamine-formaldehyde precondensate which comprises mixing melamine, from 3 to 6 mols of formaldehyde per mol of melamine and methanol, the amount of methanol not exceeding 6 mols per mol of melamine, heating this mixture at a pH of from 4 to 7 to a temperature within the range of from room temperature to 150° F. to initiate the condensation reaction between the melamine and the formaldehyde, and after the condensation has been initiated and proceeded for at least 35% of the total reaction time but before completion of the reaction adding to the reaction mixture from 0.1 to 0.5 mol of urea and from 0.1 to 0.5 mol of glycerine per mol of melamine, thereafter heating the resultant reaction mixture to a temperature within the range of from 160° F. to 190° F. and maintaining the reaction mixture at this temperature until a melamine-formaldehyde precondensate having a concentration of from 65% to 75% resin solids is produced and cooling the product to a temperature of from 60° F. to 120° F.

2. The melamine-formaldehyde precondensate produced by the process of claim 1, soluble in water in all proportions, having a specific gravity at 70° F. of 1.15 to 1.18 and a pH in water solution of from 5.8 to 6.9.

TABLE

| Constituents | II | III | IV | V | VI | VII | VIII | IX | X | XI | XII |
|---|---|---|---|---|---|---|---|---|---|---|---|
| Formaldehyde | 580 | 580 | 580 | 580 | 580 | 580 | 580 | 580 | 580 | 580 | 580 |
| Melamine | 200 | 200 | 200 | 200 | 200 | 200 | 200 | 200 | 200 | 200 | 200 |
| Glycerine | 60 | 60 | 60 | 60 | 60 | 60 | | | | | |
| Methanol | 80 | 80 | 80 | 80 | 80 | 80 | 80 | 80 | 80 | 80 | 80 |
| Dicyanodiamide | 40 | | | | | | | | | | |
| Guanidine | | 40 | | | | | | | | | |
| Benzamide | | | 40 | | | | | | | | |
| Formamide | | | | 40 | | | | | | | |
| Acetamide | | | | | 40 | | | | | | |
| Thiourea | | | | | | 40 | | | | | |
| Urea | | | | | | | 40 | 40 | 40 | 40 | 40 |
| Ethylene Glycol | | | | | | | 50 | | | | |
| Propylene Glycol | | | | | | | | 60 | | | |
| Hexylene Glycol | | | | | | | | | 60 | | |
| Erythritol | | | | | | | | | | 70 | |
| Pentaerythritol | | | | | | | | | | | 80 |

The reaction products from the examples given in the above table, in each case, was soluble in cold water in all proportions. Their pH and specific gravity were substantially the same as the product produced in Example I.

Since certain changes in the above described process for producing melamine-formaldehyde resin and in the resultant resin precondensates, which embody this invention, can be made without departing from the scope of this invention, it is intended that all matter contained in this description shall be interpreted as illustrative and not in a limiting sense.

References Cited

UNITED STATES PATENTS

| | | | |
|---|---|---|---|
| 2,577,767 | 12/1951 | Jones | 260—67.6 |
| 2,684,347 | 7/1954 | Nickerson | 260—29.4 |
| 2,856,314 | 10/1958 | Wooding et al. | 117—71 |
| 2,892,810 | 6/1959 | Albrecht | 260—67.6 |
| 3,052,570 | 9/1962 | Polansky et al. | 117—1394 |
| 3,067,176 | 12/1962 | Poon | 260—67.6 |

WILLIAM H. SHORT, *Primary Examiner.*

H. SCHAIN, *Assistant Examiner.*